United States Patent
Krichevsky (10) Patent No.: US 9,099,103 B1
(45) Date of Patent: Aug. 4, 2015

(54) HEAT ASSISTED MAGNETIC RECORDING WITH INTERLACED HIGH-POWER HEATED AND LOW-POWER HEATED TRACKS

(71) Applicant: Western Digital Technologies, Inc., Irvine, CA (US)

(72) Inventor: Alexander Krichevsky, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/520,064

(22) Filed: Oct. 21, 2014

(51) Int. Cl.
G11B 11/00 (2006.01)
G11B 7/126 (2012.01)
G11B 11/105 (2006.01)
G11B 5/00 (2006.01)

(52) U.S. Cl.
CPC .......... *G11B 7/126* (2013.01); *G11B 11/10595* (2013.01); *G11B 11/10515* (2013.01); *G11B 2005/0021* (2013.01)

(58) Field of Classification Search
USPC .............. 369/13.26, 13.14, 13.25, 13.27
See application file for complete search history.

(56) References Cited

U.S. PATENT DOCUMENTS

| | | | |
|---|---|---|---|
| 5,982,714 A * | 11/1999 | Koda | 369/13.24 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,278,667 B1 * | 8/2001 | Belser | 369/13.01 |

(Continued)

*Primary Examiner* — Tan X Dinh (57) ABSTRACT

A method, system and apparatus are described for increasing areal density and track density for a data storage system. Media with high magneto-crystalline anisotropy is heated locally during writing, utilizing heating methods such as heat-assisted magnetic recording, energy assisted magnetic recording, thermally assisted recording. In an aspect, high-power heated tracks of a magnetic recording layer are heated and written, and then low-power heated tracks are heated and written. The high-power heated tracks and the low-power heated tracks are interlaced, such that a low-power heated track is situated between two high-power heated tracks. In an aspect, media rewriting speed is increased. In an aspect, the high-power heated tracks and low-power heated tracks are written to at substantially the same data rate and linear density. In an aspect, any erasure of any portion of the high-power heated tracks from heating the low-power heated tracks is avoided, or minimized.

21 Claims, 6 Drawing Sheets

(56) References Cited

U.S. PATENT DOCUMENTS

| | | |
|---|---|---|
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,356,515 B1 * | 3/2002 | Kumita et al. ............. 369/13.26 |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |

(56) References Cited

U.S. PATENT DOCUMENTS

| | | |
|---|---|---|
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,007 B2 | 7/2006 | Liu et al. |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,251 B2 * | 8/2006 | Naoi et al. ............... 369/53.13 |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,081,542 B1 | 12/2011 | Grobis et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |

(56) References Cited

U.S. PATENT DOCUMENTS

| | | |
|---|---|---|
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2006/0013089 A1* | 1/2006 | Kobayashi et al. ......... 369/47.53 |
| 2006/0024529 A1* | 2/2006 | Murakami ..................... 428/810 |
| 2006/0117333 A1* | 6/2006 | Taguchi et al. ............... 720/659 |
| 2007/0230012 A1* | 10/2007 | Erden et al. ..................... 360/75 |
| 2009/0113702 A1 | 5/2009 | Hogg |
| 2010/0306551 A1 | 12/2010 | Meyer et al. |
| 2011/0205861 A1* | 8/2011 | Erden et al. ................ 369/13.27 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0294207 A1 | 11/2013 | Erden et al. |

\* cited by examiner

HEAT ASSISTED MAGNETIC RECORDING WITH INTERLACED HIGH-POWER HEATED AND LOW-POWER HEATED TRACKS

BACKGROUND

Magnetic storage systems are utilized in a wide variety of devices in both stationary and mobile computing environments. Magnetic storage systems include hard disk drives (HDD), and solid state hybrid drives (SSHD) that combine features of a solid-state drive (SSD) and a hard disk drive (HDD). Examples of devices that incorporate magnetic storage systems include desktop computers, portable notebook computers, portable hard disk drives, servers, network attached storage, digital versatile disc (DVD) players, high definition television receivers, vehicle control systems, cellular or mobile telephones, television set top boxes, digital cameras, digital video cameras, video game consoles, and portable media players.

These numerous devices utilize magnetic storage systems for storing and retrieving digital information. Storage density is a measure of the quantity of digital information that can be stored on a given length of track, area of surface, or in a given volume of a magnetic storage medium. Higher density is generally more desirable since it allows greater volumes of data to be stored in the same physical space. Density generally has a direct effect on performance within a particular medium. Increasing the storage density of disks requires technological advances and changes to various components of a hard disk.

BRIEF DESCRIPTION OF THE DRAWINGS

The foregoing aspects and many of the attendant advantages described herein will become more readily appreciated by reference to the following detailed description, when taken in conjunction with the accompanying drawings, wherein.

DETAILED DESCRIPTION

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method and system are described herein with reference to figures.

Reference throughout this specification to "one embodiment," "an embodiment," or similar language means that a particular feature, structure, electronic device, method or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, methods, electronic devices, or characteristics may be combined in any suitable manner in one or more embodiments.

With the numerous devices currently utilizing magnetic storage systems, hard disk drive (HDD) performance demands and design needs have intensified, including a need for increased storage density. There is an ongoing effort within the HDD industry to increase memory storage capacity while maintaining the same external drive form factors. Areal density is a measure of the number of bits that can be stored in a given unit of area, usually expressed in bits per square inch (BPSI). Being a two-dimensional measure, areal density is computed as the product of two one-dimensional density measures, namely linear density and track density. Linear Density is a measure of how closely bits are situated within a length of track, usually expressed in bits per inch (BPI), and measured along the length of the tracks around a disk. Track Density is a measure of how closely the concentric tracks on the disk are situated, or how many tracks are placed in an inch of radius on the disk, usually expressed in tracks per inch (TPI). The current demand for larger memory storage capacity in a smaller dimension is therefore linked to the demand for ever increasing storage track density.

Systems and methods are described herein for increasing areal density and track density for a data storage system. In an embodiment, a method is described to increase media rewriting speed. In an embodiment, data is written to a magnetic memory system using heat-assisted magnetic recording (HAMR). Alternative names or technologies other than HAMR that embodiments utilize include energy assisted magnetic recording (EAMR), and thermally assisted recording (TAR). In an embodiment, high-power heated and low-power heated tracks of a magnetic recording layer are interlaced. In an embodiment, the high-power heated tracks and low-power heated tracks are written to at substantially the same data rate and linear density. In an embodiment, any intrusion or erasure of any portion of the high-power heated tracks from heating the low-power heated tracks is avoided, or minimized. The systems and methods disclosed may be utilized with a disk drive memory system, and other magnetic memory systems, including hard disk drives (HDD), hybrid hard drives (HHD), solid state hybrid drives (SSHD), and a digital versatile disc (DVD).

Figure 1:
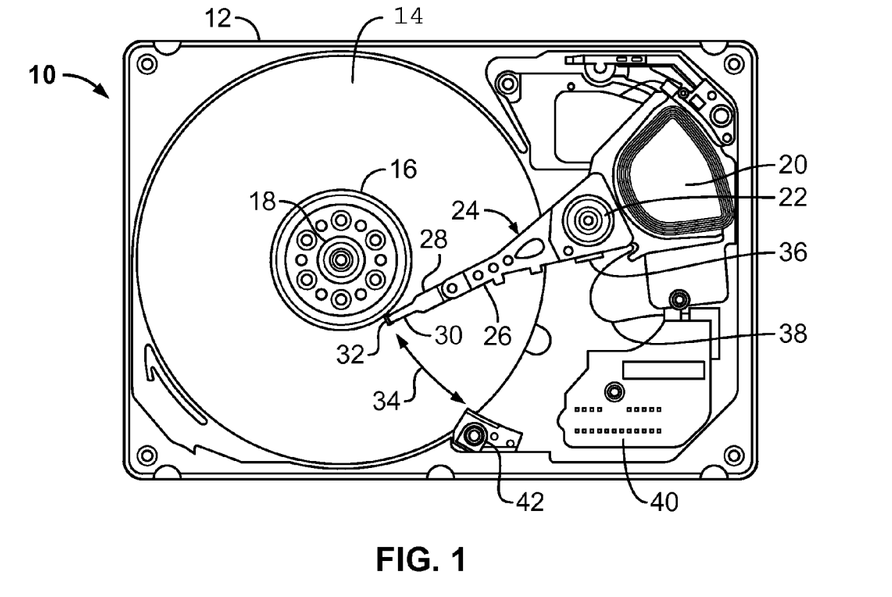
FIG. 1 is a top plan view of a disk drive data storage system in which embodiments are useful.

Referring to the figures wherein identical reference numerals denote the same elements throughout the various views, FIG. 1 illustrates a disk drive storage system 10, in which embodiments are useful. Features of the discussion and claims are not limited to this particular design, which is shown only for purposes of the example. Disk drive 10 includes base plate 12 that may be disposed on a top cover forming a sealed environment to protect internal components from contamination. Disk drive 10 further includes one or more data storage disks 14 of computer-readable data storage media. The disks are generally formed of two main substances, namely, a substrate material that gives it structure and rigidity, and a magnetic media coating that holds magnetic impulses or moments that represent data. Typically, both of the major surfaces of each data storage disk 14 include a plurality of concentrically disposed tracks for data storage purposes. Each data storage disk 14 is mounted on a hub or spindle 16, which in turn is rotatably interconnected with a base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor (VCM) 20 is a magnetic assembly that controls the operation of the actuator arm assembly 24 under the direction of control electronics 40.

A suspension 28 is attached to the free end of each actuator arm 26 and cantilevers therefrom. The slider 30 is disposed at or near the free end of each suspension 28. What is commonly referred to as the read/write head (e.g., transducer) is mounted as a head unit 32 under the slider 30 and is used in disk drive read/write operations. As the suspension 28 moves, the slider 30 moves along arc path 34 and across the corresponding data storage disk 14 to position the head unit 32 at a selected position on the data storage disk 14 for the disk drive read/write operations. The read/write head senses and/or changes the magnetic fields stored on the disks. Perpendicular magnetic recording (PMR) involves recorded bits that are stored in a generally planar recording layer in a generally perpendicular or out-of-plane orientation. A PMR read head and a PMR write head are usually formed as an integrated read/write head on an air-bearing slider. When the disk drive 10 is not in operation, the actuator arm assembly 24 may be pivoted to a parked position utilizing ramp assembly 42. The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations.

The data storage disks 14 include a plurality of embedded servo sectors each comprising coarse head position information, such as a track address, and fine head position information, such as servo bursts. As the head 32 passes over each servo sector, a read/write channel processes the read signal emanating from the head to demodulate the position information. The control circuitry processes the position information to generate a control signal applied to the VCM 20. The VCM 20 rotates the actuator arm 26 in order to position the head over a target track during the seek operation, and maintains the head over the target track during a tracking operation. The head unit 32 may utilize various types of read sensor technologies such as anisotropic magnetoresistive (AMR), giant magnetoresistive (GMR), tunneling magnetoresistive (TMR), other magnetoresistive technologies, or other suitable technologies.

There is an ongoing effort within the magnetic recording industry to increase memory storage capacity. To increase areal density beyond conventional magnetic recording media designs, smaller bits may be used, but this can cause thermal instabilities. To avoid this, media with high magneto-crystalline anisotropy ($K_u$) may be used. However, increasing $K_u$ also increases the coercivity of the media, which can exceed the write field capability of the write head. Since it is known that the coercivity of the magnetic material of the recording layer is temperature dependent, one method to address thermal stability and increased coercivity is using heat-assisted magnetic recording (HAMR), wherein high-$K_u$ magnetic recording material is heated locally during writing by the write head to lower the coercivity enough for writing to occur, but where the coercivity/anisotropy is high enough for thermal stability of the recorded bits at the ambient temperature of the disk drive (e.g., the normal operating or "room" temperature of approximately 15-30° C.). In some HAMR systems, the magnetic recording material is heated to near or above its Curie temperature. The recorded data is then read back at ambient temperature by a conventional magnetoresistive read head, e.g., a giant magnetoresistance (GMR) or tunneling magnetoresistance (TMR) based read head.

One type of HAMR disk drive uses a laser source and an optical waveguide coupled to a transducer, e.g., a near-field transducer (NFT), for heating the recording material on the disk. A near-field transducer is an optical device with sub-wavelength features used to concentrate the light delivered by the waveguide into spot smaller than the diffraction limit and at distance smaller than the wavelength of light. In a HAMR head, the NFT is typically located at the air-bearing surface (ABS) of the slider that also supports the read/write head, and rides or "flies" above the disk surface while creating an optical spot on the disk.

In conventional recording, media tracks are accessed for writing in random order to increase rewrite speed. However, the track density may be limited by adjacent track interference (ATI) in which a newly written track can cause erasure and/or loss of signal to noise ratio (SNR) to adjacent tracks. With HAMR, the ATI problem is especially significant since the heated spot can significantly expand into an adjacent track, softening the magnetic material such that fringe fields, including weak fringe fields, can cause serious track erasure.

Figure 2:
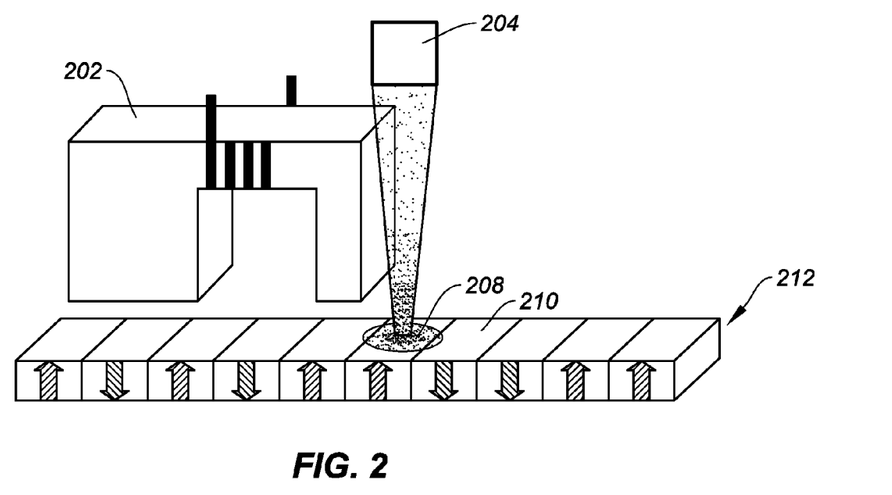
FIG. 2 is a perspective view of a head including a radiation source heating a media track, as can be used with a data storage system as in FIG. 1, in an embodiment.

FIG. 2 shows a portion of a magnetic recording assembly, as used in an embodiment. $K_u$ and the coercivity of the media are increased using a technique such as HAMR, EAMR, or TAR. In the embodiment shown, radiation source 204 (e.g., a laser) is situated to heat localized regions of the media. When writing to the media, radiation source 204 situates a heat spot 208 on track 212 of the recording medium. Radiation source 204 is capable of supplying multiple levels of output heating power. In an embodiment, a near-field transducer (NFT) is utilized for focusing electromagnetic energy from radiation source 204 to recording track 212. Read/write head 202 senses and/or changes the magnetic field of data bit 210 to write to the media with perpendicular or longitudinal magnetic orientation. In an embodiment, various radiation sources other than a laser as typically used with HAMR may be used to heat the localized region of the media. In an embodiment, the heating power is generated from a source other than a dynamic flying height (DFH) type slider in which the read/write head is surrounded by or adjacent to an embedded heating element that reduces local flying height.

Figure 3A:
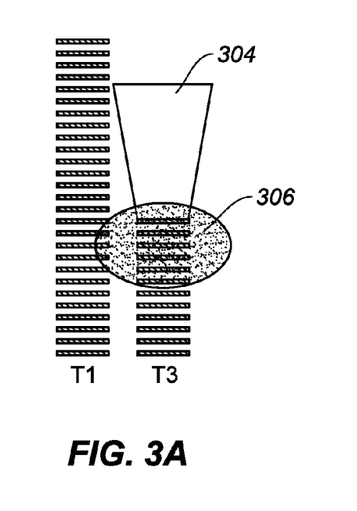
FIG. 3A is a top plan view of media tracks with a track being heated with higher power and written, in an embodiment.

Referring now to FIG. 3A, data track T1 and data track T3, as used with a magnetic storage system (e.g., a HDD), are illustrated being heated and written, according to an embodiment. Head 304, including a radiation source, heats track T1 and writes to track T1. Next, head 304 heats track T3 and writes to track T3. As illustrated, heat spot 306 is situated by a radiation source (e.g., a laser) on track T3 of the recording medium. A heat spot is also situated on track T1 when track T1 is heated. Tracks T1 and T3 are shown for illustration, but numerous or thousands of high-power heated tracks are heated and written to, in an embodiment. In an embodiment, track T1 and track T3 are heated with substantially a same power. In an embodiment, a high energy density focused beam is used to heat the tracks, which causes immediate heating of the tracks, rather than continuous heating as in conventional HAMR. In an embodiment, the laser current for heating the high-power heated tracks T1 and T3 is set in the range of 52 to 63 milliamps. Other laser currents may be used depending on factors including, but not limited to, write current, dynamic fly height (DFH), disk rotation speed, heating factors of a particular head design, or other factors that are optimized in the design of a magnetic recording device. In an embodiment, the heating current for the higher and lower heating powers is set relative to each other, rather than at a particular current level. For example, the lower heating power is set at 30 percent less power than the higher heating power. In an embodiment, the lower heating power is in the range of about 4 percent to 30 percent less power than the higher heating power. In an alternative embodiment, the lower heating power is in the range of about 4 percent to 50 percent less power than the higher heating power.

In an embodiment, track T1 is positioned a predetermined distance from track T3, sufficient for heating and writing to a track situated between track T1 and track T3 with a lower laser power, such that the lower laser power does not erase or minimizes any erasure of any portion of either, or both, of track T1 and track T3. In example, the track pitch between the high-power heated tracks (e.g., tracks T1 and T3) is set at 4.8 microinches. The factors that influence the track pitch range include the size of the laser heat spot, the ability of the media to support high linear density, and the targeted bit aspect ratio or the quality of the servo and the resulting amount of off-track excursion. In another example, the track pitch between the high-power heated tracks (e.g., tracks T1 and T3) is set in the range of 2 microinches to 5 microinches. The track pitch is not limited to this range, and depends on design factors of the magnetic recording device.

Figure 3B:
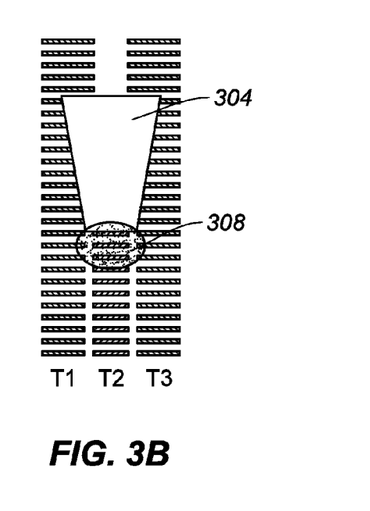
FIG. 3B is a top plan view of media tracks with a track being heated with lower power and written, in an embodiment.

FIG. 3B shows another embodiment in which track T2 is heated and head 304 writes to track T2, following the heating and writing to tracks T1 and T3 described in FIG. 3A. Track T2 is situated between track T1 and track T3. The higher power used to heat tracks T1 and T3 has a higher thermal gradient and a wider thermal spot relative to the lower power used to heat track T2. In an embodiment, the thermal spot and writing to tracks T1 and T3 intrudes into a portion of track T2. The magnetic field writing to track T2 overwrites any intrusion into track T2, in an embodiment. As illustrated, heat spot 308 is positioned by a radiation source 204 (e.g., a laser) on track T2 of the recording medium. Heat spot 308 extends a smaller distance beyond its target track T2, as compared to the distance that heat spot 306 extends beyond its high-power heated target tracks T1 or T3. Track T2 is heated with a lower power and narrower heat spot than the power and heat spot used to heat tracks T1 and T3, such that the lower power does not erase or minimizes any erasure of any portion of either track T1 or track T3, or both track T1 and track T3. In an embodiment, therefore, the bit polarity of tracks T1 and T3 may be randomized at the edges by the heat spot used to heat track T2, although the bit polarity at the center of tracks T1 and T3 is unchanged, remaining as it was written, and the tracks T1 and T3 retaining their linear density.

In an embodiment, the laser current for heating the low-power heated track T2 is set in the range of 46 to 57 milliamps. Other laser currents may be used depending on factors including, but not limited to, write current, dynamic fly height (DFH), disk rotation speed, heating factors of a particular head design, or other factors that are optimized in the design of a magnetic recording device. In an embodiment, the heating current for the higher and lower heating powers is set relative to each other, rather than at a particular current level. In an embodiment, the power to heat track T2 is in the range of about 4 percent to 30 percent less power than the power to heat track T1 or the power to heat track T3. In an embodiment, the radiation source may heat up to about 50 percent of the total media recording tracks with a power that is substantially the same power as track T2, or a power that is a lower power than the track T1 and T3.

In an embodiment, track T2 is written at substantially the same data rate and substantially the same linear density as track T1 and track T3. In an alternative embodiment, track T1 and the track T3 are written to at a faster data rate and at a greater linear density than the recording tracks situated between track T1 and track T3. In an embodiment in which the higher-power heated tracks have a greater linear density than the lower-power heated tracks, the lower power used to heat the lower-power heated tracks (e.g., track T2) does not affect or minimizes an effect on the higher linear density tracks (e.g., tracks T1 and T3).

In an embodiment, more than one recording track is heated and written to between track T1 and track T3. These recording tracks situated between track T1 and track T3 utilize a lower heating power than the power used to heat track T1 and track T3. In an embodiment, although tracks T1, T2, and T3 are illustrated in FIG. 3B, numerous tracks (e.g., thousands of tracks) are heated with a higher-power such as tracks T1 and T3, and lower-power such as track T2. These tracks are interlaced, such as T1, T2, T3, T4, T5, T6, T7, T8, T9 . . . Tn, where the odd-numbered tracks are higher-power heated tracks, and the even-numbered tracks are lower-power heated tracks. In an embodiment, T1 is heated and written, then T3, then T2, then T5, then T4, then T7, then T6, then T9, then T8, and so on. In an alternative embodiment, the high-power heated tracks are heated and written, such as T1, T3, T5, T7, and so on. Then the lower-power heated tracks are heated and written, such as T2, T4, T6, and so on.

In an embodiment, control circuitry sets predetermined values for track pitch, laser power, linear density, write current, and dynamic flying height, for track T1, track T2, and track T3. The track pitch between high-power heated tracks T1 and T3 is two times the track pitch between a high-power heated track T1 and a low-power heated track T2.

Media tracks may include a curvature to the bits, which can increase the complexity of reading a track. In an embodiment, tracks T1, T2 and T3 include a curvature to the bits. When a portion of the tracks heated with the higher power (e.g., tracks T1 and T3) are erased by the heating of the lower heated power tracks (e.g., track T2), then tracks T1 and T3 are trimmed, and consequently the effective bit curvature of tracks T1 and T3 are trimmed.

Figure 4:
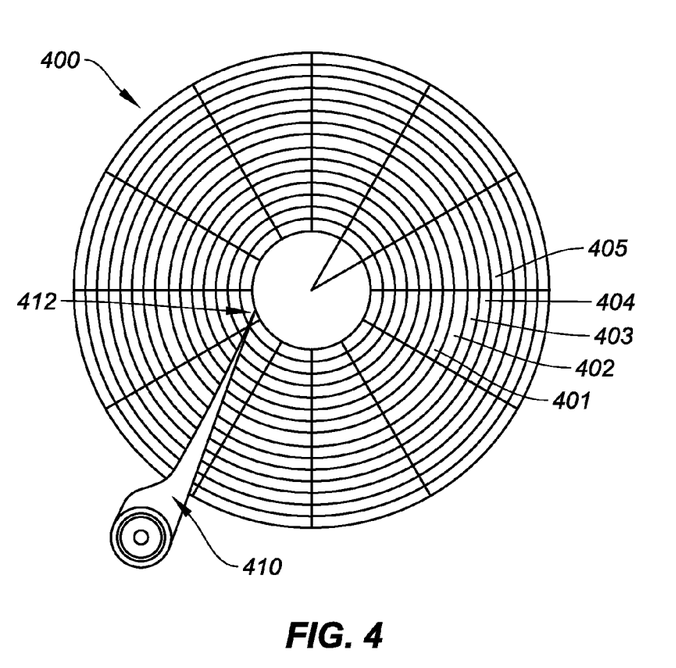
FIG. 4 is a top plan view of media and tracks used with a disk drive data storage system, in an embodiment.

FIG. 4 illustrates a portion of a magnetic memory system including magnetic recording disk 400, actuator arm assembly 410, and read/write head 412. Magnetic recording disk 400 includes a plurality of concentric data tracks. In the example embodiment, tracks 401, 403, and 405 are heated with a higher power than tracks 402 and 404. In an embodiment, track 401 is heated and written to, followed by heating and writing to track 403, followed by track 402, followed by track 405, and followed by track 404. Alternatively, tracks 401, 403 and 405 heated with the higher power may be heated and written to first, followed by tracks 402 and 404 heated with the lower power. Although tracks 401-405 are shown, in an embodiment, numerous tracks may be heated with a higher-power such as tracks 401, 403, and 405, and a lower-power such as tracks 402 and 404.

In an embodiment, the data rate and linear density of the tracks 401, 403, and 405 heated with the higher power is substantially the same as tracks 402 and 404 heated with the lower power. Here, the same data clock rate, disk rotation speed, write current and dynamic fly height (DFH) may be used for the tracks heated with the higher power and the tracks heated with the lower power. In this embodiment, the data clock rate, write current, DFH, and record of track/data rate correspondence is maintained the same between tracks. Also, in an embodiment, the read channel does not have to differentiate between the higher and lower power heated tracks within the same zone. In an embodiment, control circuitry sets predetermined values for track pitch, laser power, linear density, write current, and dynamic flying height, for tracks 401, 402, 403, 404, and 405. In an embodiment, heat is managed, providing sufficient time for components including the NFT and the read/write head 412 to cool, by heating and writing to the lower-power heated tracks.

In an embodiment, numerous sets of tracks (e.g., thousands of individual tracks) are heated and written to using a higher laser power. Next, numerous sets of tracks are heated and written to using the lower laser power (e.g., an equal number as the higher laser power tracks, minus one). Here, numerous tracks are written to and read without changing the power of a laser driver, or a preamp to a different data rate.

In an alternative embodiment, tracks 401, 403, and 405 have a greater linear density than tracks 402, and 404. In another embodiment, tracks 401, 403, and 405 are written to with a faster data rate than tracks 402 and 404.

Figure 5:
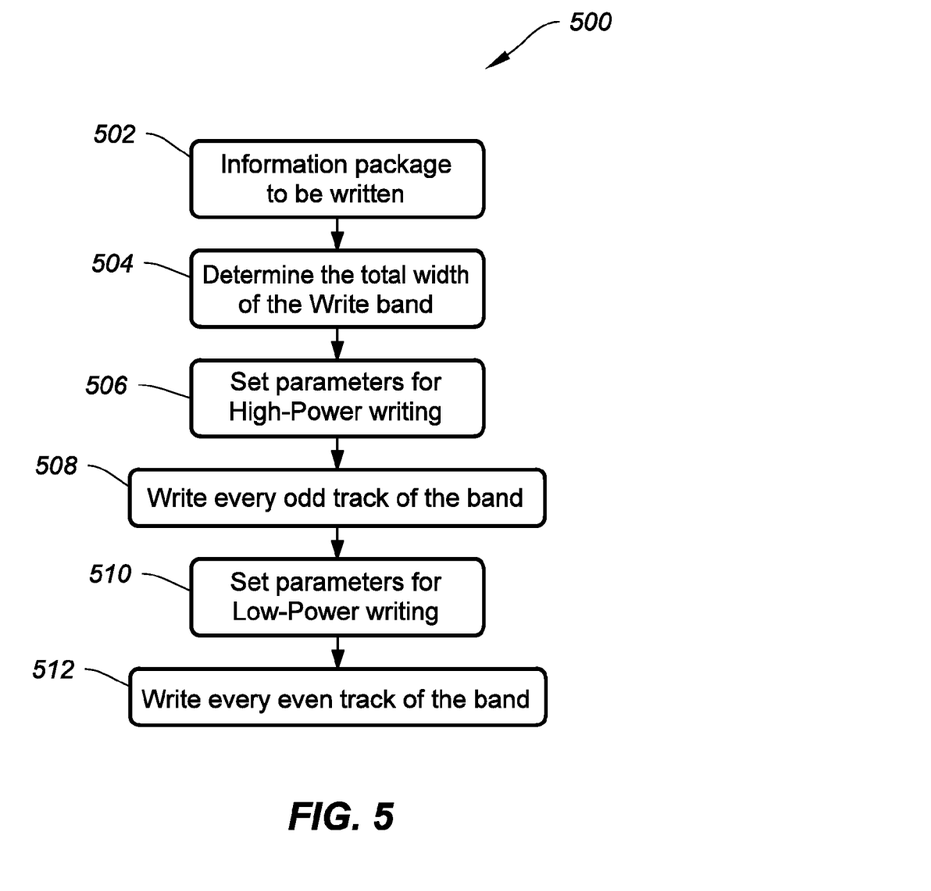
FIG. 5 is a flow diagram illustrating a method or process for interlacing high-power heated and low-power heated tracks of a magnetic recording system, in an embodiment.

FIG. 5 illustrates a method and process for interlacing high-power heated and low-power heated tracks using a technique such as HAMR, EAMR, or TAR. It will be understood that each step in the flowchart illustration can be implemented by computer program instructions. These computer program instructions may be provided to a processor of a programmable data processing apparatus, such that the instructions execute via the processor to implement the functions or actions specified in the flowchart. The instructions may be executed by controller. In an embodiment, the controller is a component of a HDD. In an alternative embodiment, the controller is separate from the HDD and may be connected to the HDD to externally monitor and communicate with the HDD.

As shown, in an embodiment, an information package is intended to be written to a magnetic storage disk, as detailed in step 502. Next, as stated in step 504, the total width of the write band is determined, considering factors including amount of data (e.g., 1 MB) and track capacity. Factors are considered and determined including the number of tracks to be interlaced using high power heat and low power heat prior to track writing, as well as track pitch. Next, as stated in step 506, the predetermined heating power and linear density are set for high-power heating and writing to disk tracks. Next, as stated in step 508, every odd track of a band is written. As stated in step 510, the predetermined heating power and linear density are set for low-power heating and writing to disk tracks. Next, as stated in step 512, every even track of a band is written. The even tracks are situated between the odd tracks.

Figure 6:
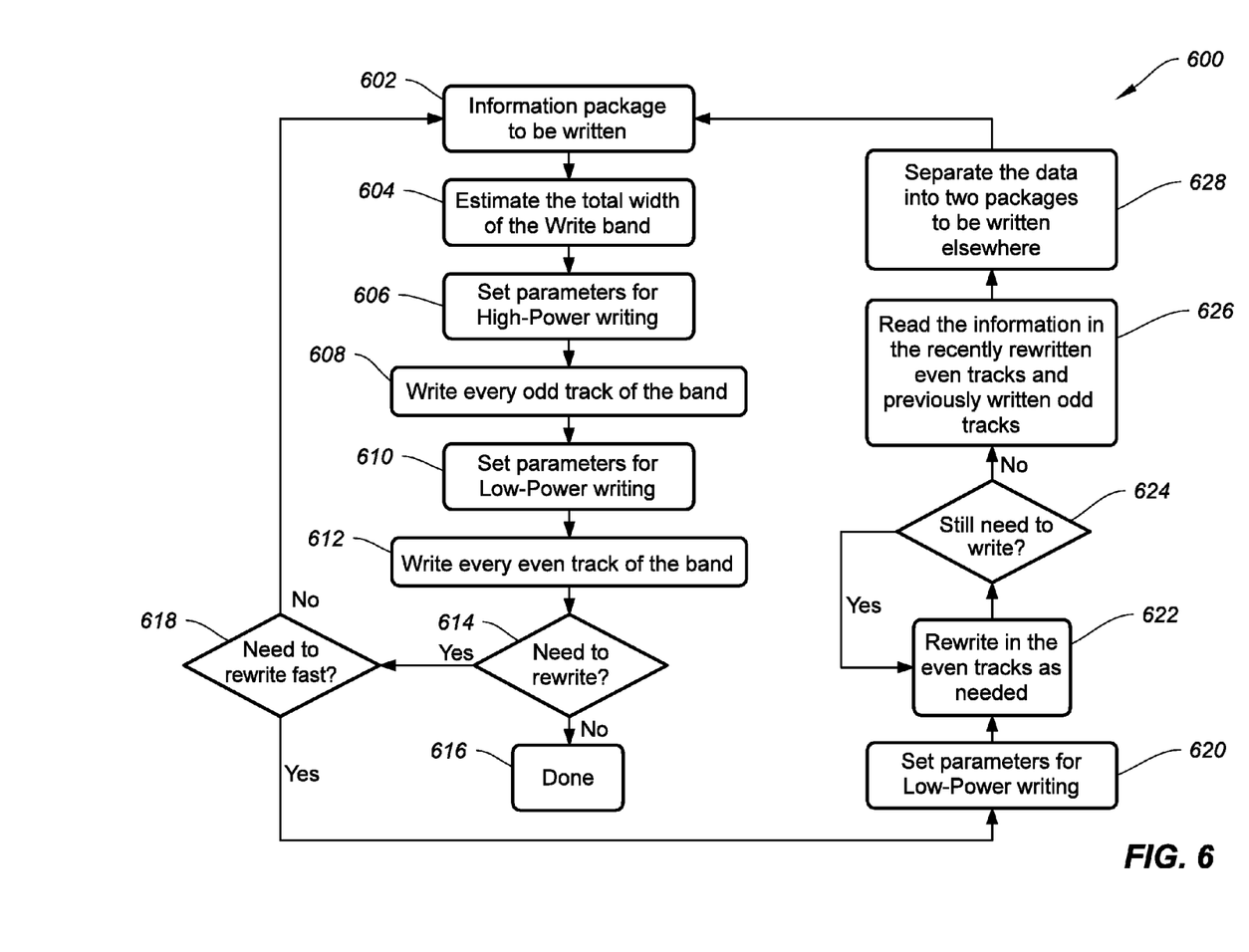
FIG. 6 is a flow diagram illustrating a method or process for interlacing high-power heated and low-power heated tracks of a magnetic recording system, and rewriting fast to the low-power heated tracks as needed, in an embodiment.

FIG. 6 illustrates a method and process for interlacing high-power heated and low-power heated tracks of a magnetic recording system, and rewriting fast to the low-power heated tracks as needed, in an embodiment. Steps 602 through 612 are the same as steps 502 through 512 as described in FIG. 5. In a further embodiment, steps 614 through are 628 are described.

As stated in step 614, a query is presented whether a rewrite to the media is needed. If the query of step 614 is answered negative, then there is no rewrite, as stated in step 616. If the query of step 614 is answered affirmative, a query is presented in step 618 whether the media is needed to be rewritten fast. If the query of step 618 is answered negative, then the method proceeds to step 602. If the query of step 618 is answered affirmative, then predetermined heating power and linear density are set for low-power heating and writing to disk tracks, as stated in step 620. In an embodiment, since the lower-power heating causes minimal or no erasure of adjacent tracks, the lower-power heated tracks are accessed at random and rewritten fast. In an embodiment, up to about 50 percent of the total media tracks are available for heating with a lower power (e.g., track T2, FIG. 3B) and random rewriting, as compared to the higher-power heated tracks (e.g., tracks T1 and T3, FIG. 3B). Next, as stated in step 622, the tracks previously heated with the lower power and written are reheated and rewritten with data.

Next, as stated in step 624, a query is presented with a rewrite to the media is needed. If the query of step 624 is answered in the affirmative, then the method proceeds to step 622 again. If the query of step 624 is answered in the negative, then, as stated in step 626, the information is read in the recently rewritten even tracks pursuant to step 622, and from the tracks written pursuant to step 608. Next, as stated in step 628, the data written pursuant to step 608 and step 622 is separated and written to other separate tracks. In an alternative embodiment, the data written pursuant to steps 608 and 622 is optionally separated and written to other separate tracks. The method then proceeds to step 602, continuing as described.

Figure 7:
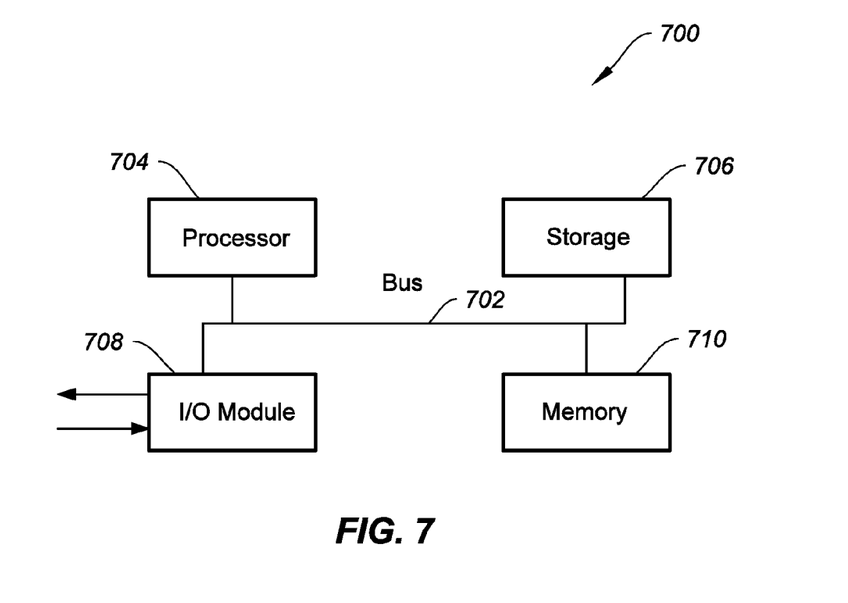
FIG. 7 is a sectional view representation illustrating components of a system that executes methods of an embodiment.

Turning now to FIG. 7, components of system 700 are illustrated, in an embodiment. System 700 includes processor module 704, storage module 706, input/output (I/O) module 708, memory module 710, and bus 702. Although system 700 is illustrated with these modules, other suitable arrangements (e.g., with more or less modules) known to those of ordinary skill in the art may be used. For example, system 700 may be a logic implemented state machine or a programmable logic controller.

In an embodiment, the methods described herein are executed by system 700. Specifically, processor module 704 executes one or more sequences of instructions contained in memory module 710 and/or storage module 706. In one example, instructions may be read into memory module 710 from another machine-readable medium, such as storage module 706. In another example, instructions may be read directly into memory module 710 from I/O module 708, for example from an operator via a user interface. Information may be communicated from processor module 704 to memory module 710 and/or storage module 706 via bus 702 for storage. In an example, the information may be communicated from processor module 704, memory module 710, and/or storage module 706 to I/O module 708 via bus 702.

The information may then be communicated from I/O module 708 to an operator via the user interface.

Memory module 710 may be random access memory or other dynamic storage device for storing information and instructions to be executed by processor module 704. In an example, memory module 710 and storage module 706 are both a machine-readable medium. In an embodiment, processor module 704 includes one or more processors in a multi-processing arrangement, where each processor may perform different functions or execute different instructions and/or processes contained in memory module 710 and/or storage module 706. For example, one or more processors may execute instructions for heating and writing to tracks, and one or more processors may execute instructions for input/output functions. Also, hard-wired circuitry may be used in place of or in combination with software instructions to implement various example embodiments. Thus, embodiments are not limited to any specific combination of hardware circuitry and software. Bus 702 may be any suitable communication mechanism for communicating information. Processor module 704, storage module 706, I/O module 708, and memory module 710 are coupled with bus 702 for communicating information between any of the modules of system 700 and/or information between any module of system 700 and a device external to system 700. For example, information communicated between any of the modules of system 700 may include instructions and/or data.

Circuit or circuitry, as used herein, includes all levels of available integration, for example, from discrete logic circuits to the highest level of circuit integration such as VLSI, and includes programmable logic components programmed to perform the functions of embodiments as well as general-purpose or special-purpose processors programmed with instructions to perform those functions. Machine-readable medium, as used herein, refers to any medium that participates in providing instructions to processor module 704 for execution. Such a medium may take many forms, including, but not limited to, non-volatile media, and volatile media. Non-volatile media includes, for example, optical or magnetic disks, such as storage module 706. Volatile media includes dynamic memory, such as memory module 710. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

In an embodiment, a non-transitory machine-readable medium is employed including executable instructions for writing to a data storage system. The instructions include code for heating a first track of a recording media with a first power using a radiation source, writing to the first track, heating a third track with a third power, writing to the third track, heating a second track with a second power, and writing to the second track. The first power and the third power are a higher power than the second power, and the second track is situated between the first track and the third track.

In an embodiment, the non-transitory machine-readable medium further includes executable instructions for writing to the second track at substantially the same data rate and linear density as the first track and the third track. In an embodiment, the radiation source is a laser. In an embodiment, the non-transitory machine-readable medium further includes executable instructions for setting the first power and the third power at substantially a same power. In an embodiment, the non-transitory machine-readable medium further includes executable instructions for setting the second power in the range of about 4 percent to 30 percent less power than the first power and the third power.

In an embodiment, the non-transitory machine-readable medium further includes executable instructions for setting predetermined values for track pitch, heating power, linear density, write current, and dynamic flying height, for the first track, the second track, and the third track.

In an embodiment, the non-transitory machine-readable medium further includes executable instructions for recording or making available for recording up to about 50 percent of the total recording tracks utilizing substantially the same power as the second power, or utilizing a lower power than the first power and the third power.

In an embodiment, the recording media further includes odd numbered tracks and even numbered tracks. The non-transitory machine-readable medium further includes executable instructions for interlacing the odd numbered tracks and the even numbered tracks, such that an individual even numbered track is situated between two odd numbered tracks. The instructions further include code for heating the odd numbered tracks with substantially the same power as the first power, and heating the even numbered tracks with substantially the same power as the second power, wherein the power to heat the odd numbered tracks is greater than the power to heat the even numbered tracks.

In an embodiment, the non-transitory machine-readable medium further includes executable instructions for heating a fifth track with a fifth power, and writing to the fifth track before heating and writing to the second track, wherein the fifth power is a higher power than the second power, and the fifth track is not situated between the first track and the third track.

In an embodiment, the non-transitory machine-readable medium further includes executable instructions for reheating the second track with the second power, rewriting to the second track, reading the first track, reading the second track, reading the third track, rewriting the data from the first track and from the third track to a first media location, and rewriting the data from the second track to a second media location.

In an embodiment, the non-transitory machine-readable medium further includes executable instructions for heating and writing more than one recording track between the first track and the third track, wherein the recording tracks are heated with a lower power than the first power and the third power.

In an embodiment, the non-transitory machine-readable medium further includes executable instructions for heating a first track of a recording media with a first power using a radiation source, writing to the first track, heating a third track with a third power, and writing to the third track. The instructions further include code for positioning the third track a predetermined distance from the first track, sufficient for heating a second track with a second power and writing to the second track, such that the second power does not erase or minimizes any erasure of at least one of the first track and the third track. The first power and the third power are set at a higher power than the second power. The second track is situated between the first track and the third track.

Modifications and variations may be made to the disclosed embodiments while remaining within the spirit and scope of the method, system and apparatus. The implementations described above and other implementations are within the scope of the following claims.

I claim:

1. A data storage system comprising:
   a recording media including recording tracks;
   a head situated to write to the media; and
   a radiation source situated to heat a first track with a first power, a second track with a second power, and a third track with a third power, wherein the second track is situated between the first track and the third track, and wherein the first power and the third power are greater than the second power.

2. The data storage system of claim 1, wherein the radiation source is a laser, and further comprising a near-field transducer (NFT) for focusing electromagnetic energy from the laser to one of the recording tracks.

3. The data storage system of claim 1, wherein the first power and the third power are substantially a same power.

4. The data storage system of claim 1, wherein the radiation source is operable to heat up to about 50 percent of the total recording tracks with a power that is substantially the same power as the second power, or a power that is a lower power than the first power and the third power.

5. The data storage system of claim 1, wherein the second track is written to at substantially the same data rate and linear density as the first track and the third track.

6. The data storage system of claim 1, wherein the recording media further includes odd numbered tracks and even numbered tracks, wherein:
the odd numbered tracks and the even numbered tracks are interlaced such that an individual even numbered track is situated between two odd numbered tracks; and
the radiation source is further operable to heat the odd numbered tracks with substantially the same power as the first power, and heat the even numbered tracks with substantially the same power as the second power, wherein the power to heat the odd numbered tracks is greater than the power to heat the even numbered tracks.

7. The data storage system of claim 1, wherein more than one recording track is situated between the first track and the third track, and wherein the radiation source is operable to heat the more than one recording track with a lower power than the first power and the third power.

8. A method for writing to a data storage device, the data storage device including a write head, a radiation source, and recording media, wherein the radiation source is situated to heat tracks of the recording media, the method comprising:
heating a first track, via the radiation source, with a first power;
writing to the first track;
heating a third track, via the radiation source, with a third power;
writing to the third track;
heating a second track, via the radiation source, with a second power; and
writing to the second track; wherein:
the first power and the third power are a higher power than the second power; and
the second track is situated between the first track and the third track.

9. The method of claim 8, further comprising writing to the second track at substantially the same data rate and linear density as the first track and the third track.

10. The method of claim 8, wherein the radiation source is a laser.

11. The method of claim 8, wherein the first power and the third power are substantially a same power.

12. The method of claim 8, wherein the second power is in the range of about 4 percent to 30 percent less power than the first power and the third power.

13. The method of claim 8, further comprising setting predetermined values for track pitch, heating power, linear density, write current, and dynamic flying height, for the first track, the second track, and the third track.

14. The method of claim 8, further comprising recording or making available for recording up to about 50 percent of the total recording tracks utilizing substantially the same power as the second power, or utilizing a lower power than the first power and the third power.

15. The method of claim 8, wherein the recording media further includes odd numbered tracks and even numbered tracks, wherein:
the odd numbered tracks and the even numbered tracks are interlaced such that an individual even numbered track is situated between two odd numbered tracks; and
the odd numbered tracks are heated with substantially the same power as the first power, and the even numbered tracks are heated with substantially the same power as the second power, wherein the power to heat the odd numbered tracks is greater than the power to heat the even numbered tracks.

16. The method of claim 8, further comprising heating a fifth track with a fifth power, and writing to the fifth track before the heating and the writing to the second track, wherein:
the fifth power is a higher power than the second power; and
the fifth track is not situated between the first track and the third track.

17. The method of claim 8, further comprising:
reheating the second track with the second power and rewriting to the second track;
reading the first track, the second track, and the third track;
rewriting the data from the first track and from the third track to a first media location; and
rewriting the data from the second track to a second media location.

18. The method of claim 8, further comprising heating and writing more than one recording track between the first track and the third track, wherein the more than one recording track is heated with a lower power than the first power and the third power.

19. A method for writing to a data storage device, the data storage device including a write head, a radiation source, and recording media, wherein the radiation source is situated to heat tracks of the recording media, the method comprising:
heating a first track, via the radiation source, with a first power;
writing to the first track;
heating a third track, via the radiation source, with a third power; and
writing to the third track; wherein:
the third track is positioned a predetermined distance from the first track, sufficient for heating a second track with a second power and writing to the second track, such that the second power does not erase or minimizes any erasure of at least one of the first track and the third track;
the first power and the third power are a higher power than the second power; and
the second track is situated between the first track and the third track.

20. The method of claim 19, wherein the radiation source is a laser.

21. The method of claim 19, wherein the second power is in the range of about 4 percent to 30 percent less power than the first power and the third power.

* * * * *